Dec. 13, 1938.        H. V. INSKEEP        2,139,957
METHOD OF CUTTING COMPOSITE METAL BODIES
Filed July 22, 1937
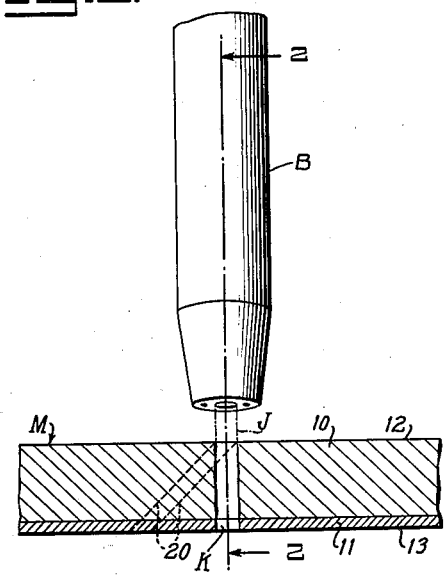
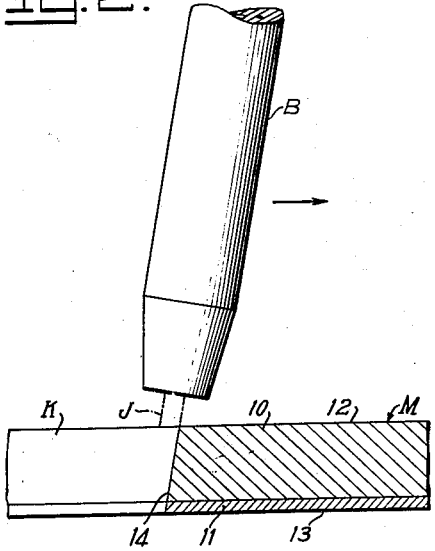
INVENTOR
HARRY V. INSKEEP
BY
ATTORNEY Patented Dec. 13, 1938

2,139,957

UNITED STATES PATENT OFFICE 2,139,957

METHOD OF CUTTING COMPOSITE METAL BODIES

Harry V. Inskeep, Fanwood, N. J., assignor to The Linde Air Products Company, a corporation of Ohio Application July 22, 1937, Serial No. 155,045

7 Claims. (Cl. 148—9)

This invention relates to a method of cutting composite metal bodies and more particularly to a method of "flame" cutting, by means of a jet of oxidizing gas, composite metal bodies having an oxidizable metal portion composed, for instance, of a plate of plain carbon or low alloy steel, integrally united to an oxidation-resistant metal portion consisting, for example, of a sheet of stainless steel or nickel. The principles of this invention are particularly useful in severing mild steel plate clad with stainless steel or nickel.

A customary procedure in cutting or severing plate clad with stainless steel or nickel consists in mechanically gouging or cutting with a suitable tool through the stainless steel or nickel and along the line of cut to be made, and then severing the mild steel or oxidizable portion by means of a cutting blowpipe so as to complete the cut. Obviously, the cutting procedure would be more economical if the entire operation could be performed with a blowpipe, but attempts to cut stainless steel or nickel clad plate by ordinary methods have not been successful. The stainless steel or nickel surface is not readily attacked by a cutting jet, and attempts to cut through the plate from the mild steel side by ordinary procedures result in a jagged edge and undercutting at the junction of the two parts of the composite plate.

An object of this invention is to provide a method of cutting composite metal bodies having an oxidizable metal portion integrally united to an oxidation-resistant metal portion in which the entire cutting operation may be carried out with a blowpipe and a relatively smooth, even cut produced. This and other objects, and the novel features of this invention, will become apparent from the following description and accompanying drawing in which:

Fig. 1 is a vertical sectional view, taken transversely to the line of cut, and illustrating the cutting, in accordance with the principles of this invention, of a mild steel plate clad with stainless steel or nickel; and Fig. 2 is a vertical sectional view taken along the line 2—2 of Fig. 1.

As shown in Figs. 1 and 2, a composite metal body or plate M has an oxidizable portion 10 of plain carbon or low alloy steel, or other oxidizable metal, and an oxidation-resistant portion 11 of stainless steel or nickel or similarly oxidation-resistant metal. The oxidizable metal portion 10, which is usually a relatively thick plate, and the oxidation-resistant metal portion 11, which is usually a relatively thin sheet, are integrally united face to face. The surface 12 or exposed face of the oxidizable metal is away from and opposite to the oxidation-resistant metal portion, and the surface 13 or exposed face of the oxidation-resistant metal is opposite to the oxidizable portion. The metal body M may be cut or severed by means of a blowpipe B which is adapted to direct preheating flames and a jet J of oxidizing gas onto the metal body in a manner described below.

In accordance with this invention, the jet J is directed onto the surface 12 of the metal body M, and the blowpipe B is inclined forwardly in the direction of relative movement, indicated by the arrow in Fig. 2, so that the jet J travels through the body at a slight angle from a perpendicular to the surface 12. An inclination of the blowpipe forwardly in the direction of relative motion at an angle of approximately 10° to a perpendicular to the surface 12 at the point of impingement of the jet J has been found to enable a speed of cutting to be obtained which is approximately as great as the speed of cutting a metal body composed entirely of mild steel or other oxidizable metal. When the cutting operation is performed in this manner, a cut or kerf K having a substantially uniform width will be produced; and a practically straight face 14 of the kerf K, inclined at the same angle as the jet J, will be present throughout the cutting operation. At a forward angle of only 5° there is a tendency toward gouging, while at a forward angle of 20° or more portions of the products of erosion and combustion or slag tend to boil into the kerf. It will usually be found desirable to use a somewhat larger and more vigorous jet of oxygen than that ordinarily used in cutting a solid mild steel plate of the same thickness.

While the drawing shows the body M disposed horizontally and the oxidizable or mild steel portion uppermost, so that the surface 12 is the top surface of the body M, and such a position is preferred, satisfactory cuts may be obtained with the body M in vertical, angular, or other positions, as long as the cutting jet J is directed onto the surface 12 or exposed face of the mild steel, and the blowpipe or jet is inclined forwardly in the direction of relative movement.

Either the blowpipe B or the metal body M may be propelled to produce the relative motion between the two, or a combination of movement of both may be utilized. The relative movement preferably progresses continuously at a uniform rate, the actual rate depending principally upon the thickness of the composite metal body M.

When the blowpipe B is utilized in the usual manner with the jet J directed perpendicularly onto the surface 12, the cutting operation will have proceeded but a short distance into the body before a front cavity and side cavities will form in the mild steel adjacent the stainless steel. Simultaneously, a lip of stainless steel will form; and during the cutting operation the lip will become intermittently longer and shorter, with large portions or chunks of stainless steel dropping out at intervals, while the cavities will become alternately larger and smaller. The resulting cut or kerf will be uneven and irregular, with cavities of intermittently larger and smaller extent present along its length.

Were the jet J to be directed onto the surface 13, or exposed face of the stainless steel or nickel, a smooth cut could not be produced, since stainless steel and nickel cannot be cut effectively by the oxidizing action of the jet, the removal of stainless steel or nickel being effected through melting by the preheating flames alone and a washing action of the jet. The resultant irregularity of cut through the stainless steel or nickel and a corresponding irregularity of cut through the mild steel renders such a procedure impractical for most commercial applications. But, with the jet directed onto the plain carbon steel or other oxidizable metal, a smooth cut can be produced, since the stainless steel or nickel can be melted and eroded away effectively by the combined actions of the jet, the molten slag, and the products of combustion of the oxidizable metal flowing over the stainless steel or nickel. However, since slag and products of combustion and erosion of the oxidizable metal are present in both perpendicular and inclined cutting, it is apparently not the presence of molten slag alone which accounts for the unusual results achieved by inclining the jet.

The principles of this invention may also be applied to bevel cutting, in which the jet is directed at a lateral angle or sidewise to produce a cut or kerf having walls inclined at an angle to the surfaces 12 and 13, such as indicated by dotted lines 20 of Fig. 1, although the angle of forward inclination may be somewhat less than in other types of cutting.

It is to be understood that the oxidizable portion need not be mild steel, but may be any low or high carbon steel or similar metal which may be severed by the thermo-chemical action of a jet of oxidizing gas; and that the oxidation-resistant portion need not be stainless steel or nickel, but may be any metal or alloy which is susceptible only to a limited degree to the thermo-chemical action of a jet of oxidizing gas.

It is to be further understood that blowpipes other than that illustrated or other apparatus may be used in carrying out this invention; and that other changes may be made which will not depart from the spirit and scope of this invention.

What is claimed is:

1. A method of flame cutting a composite metal plate consisting of a sheet of oxidation-resistant metal integrally united to one face of a plate of readily oxidizable metal, such method comprising simultaneously applying a localized high-temperature heating medium and a jet of oxidizing gas against the other or exposed face of said plate of oxidizable metal; and effecting relative motion between said composite plate and said heating medium and jet while maintaining said jet inclined in the direction of cutting and slightly forwardly from a perpendicular to said plate at the point of impingement of said jet.

2. A method of flame cutting a composite plate, as claimed in claim 1, in which said sheet of oxidation-resistant metal is substantially thinner than said plate of oxidizable metal, and such relative motion is continuous and at a uniform rate in a predetermined direction.

3. A method of flame cutting a composite metal body consisting of a sheet of oxidation-resistant metal integrally united to a plate of readily oxidizable metal, such method comprising applying a jet of oxidizing gas onto a heated portion of the exposed face of said plate of oxidizable metal; effecting a relative movement between said body and said jet; and during such movement inclining said jet in the direction of cutting and forwardly from a perpendicular to said body at the point of impingement of said jet.

4. A method of flame cutting a composite metal body as in claim 3, in which said jet is inclined forwardly at an angle of not less than 5° and not greater than 20°.

5. A method of flame cutting a composite metal body as in claim 3, in which said jet is inclined forwardly at an angle of substantially 10°.

6. A method of flame cutting a composite metal body consisting of a sheet of oxidation-resistant metal integrally united to a plate of readily oxidizable metal, such method comprising positioning said body with the exposed face of the oxidizable metal uppermost; applying simultaneously a localized high-temperature heating medium and a jet of oxidizing gas upon said exposed face of said oxidizable metal; effecting a relative movement between said heating medium and jet and said composite body so as to cause said heating medium and jet to follow a predetermined path with respect to said body; and during such movement maintaining said jet inclined in the direction of motion forwardly from a perpendicular to said exposed face at the point of impingement of said jet.

7. A method of flame cutting a composite metal body consisting of a sheet of oxidation-resistant metal integrally united to one face of a plate of readily oxidizable metal, to produce a bevel cut having walls inclined at an angle to the outer surfaces of said body, such method comprising directing a heating flame and a jet of oxidizing gas from a blowpipe onto the exposed face of readily oxidizable metal of said body; effecting a relative movement between said blowpipe and said body so as to cause said blowpipe to follow a predetermined path with respect to said body; during such movement inclining said blowpipe with respect to said exposed face and laterally with respect to the direction of motion so as to produce the desired bevel; and simultaneously inclining said blowpipe in the direction of motion and forwardly with respect to a perpendicular to said exposed face at the point of impingement of said jet.

HARRY V. INSKEEP.

CERTIFICATE OF CORRECTION.

Patent No. 2,139,957.   December 13. 1938.

HARRY V. INSKEEP.

It is hereby certified that error appears in the printed specification of the above numbered patent requiring correction as follows: Page 1, first column, lines 48 and 50, before the word "portion" insert layer or; page 2, second column, line 16, claim 3, for "sheet" read layer; lines 17 and 20, same claim, for "plate" read layer; line 34, claim 6, before "sheet" insert relatively thin; line 35, same claim, before "plate" insert relatively thick; line 40, same claim 6, for "oxidizing gas upon" read oxygen against; and that the said Letters Patent should be read with this correction therein that the same may conform to the record of the case in the Patent Office.

Signed and sealed this 31st day of January, A. D. 1939.

Henry Van Arsdale (Seal)   Acting Commissioner of Patents.